›United States Patent [19]

White

[11] 3,977,505
[45] Aug. 31, 1976

[54] CLUTCHES AND VIBRATION DAMPERS
[75] Inventor: David John White, Leeds, England
[73] Assignee: Powder Couplings Limited, Leeds, England
[22] Filed: June 16, 1975
[21] Appl. No.: 586,854

[30] Foreign Application Priority Data
June 18, 1974 United Kingdom............... 26823/74

[52] U.S. Cl. .............................. 192/105 A; 241/73
[51] Int. Cl.² ........................................ F16D 37/00
[58] Field of Search ............ 192/105 A, 58 A, 58 B; 241/73

[56] References Cited
UNITED STATES PATENTS
1,192,233 7/1916 Severy .............................. 192/58 B
3,758,035 9/1973 Ushiku et al. ........................... 241/73

FOREIGN PATENTS OR APPLICATIONS
855,253 11/1960 United Kingdom............... 192/58 A
1,340,695 12/1973 United Kingdom............. 192/105 A Primary Examiner—Benjamin W. Wyche
Attorney, Agent, or Firm—Browdy and Neimark

[57] ABSTRACT

A mechanism which is operable as a clutch or vibration damper comprises two rotatable members. One of the members is mounted coaxially within the other member and has a radial extension which extends into a chamber formed in the other member. Particulate drive transmitting medium is contained in the chamber. Relative rotation between the two members is permitted up to a certain limit velocity, above which the drive transmitting medium, under the action of centrifugal force, provides sufficient frictional contact between the two members as to permit drive to be transmitted between the two members. A passage extends radially outwardly from the chamber. A screen across the passage permits only particles smaller than the particles of drive transmitting medium to escape therethrough out of the chamber in use of the mechanism.

11 Claims, 2 Drawing Figures

- FIG.1 -

CLUTCHES AND VIBRATION DAMPERS

BACKGROUND OF THE INVENTION

The present invention relates to mechanisms suitable for use as clutches or vibration dampers.

In a known such mechanism described in British Pat. Specification No. 1,340,695 and operable as a clutch a housing is mounted coaxially on a rotor for rotation with respect thereto and defines with the rotor an annular space. The rotor includes a radial flange which extends into the space and drive is transmitted between the flange and the housing by particulate drive transmitting medium in the space. The housing defines a narrow passage extending radially outwardly of the space which passage is dimensioned so as to prevent particles of drive transmitting medium from passing through the passage while allowing the escape of dust created by the drive transmitting medium.

The limitations on the dimensions of the passage severely restricted the effectiveness of the passage in clearing the charge of unwanted dust.

SUMMARY OF THE PRESENT INVENTION

The object of the present invention is to provide a mechanism operable as a clutch or vibration damper with improved effectiveness in clearing the charge of unwanted dust.

According to the present invention this is achieved by replacing the narrow passage by a passage spanned by a screen or gauze having openings which are dimensioned to allow the passage of dust but not that of drive transmitting medium.

Accordingly the width of the passage can be substantially greater than that previously possible.

BRIEF DESCRIPTION OF THE DRAWINGS

The present invention will now be described, by way of example, with reference to the accompanying drawings, in which.

PREFERRED EMBODIMENT

Figure 1:
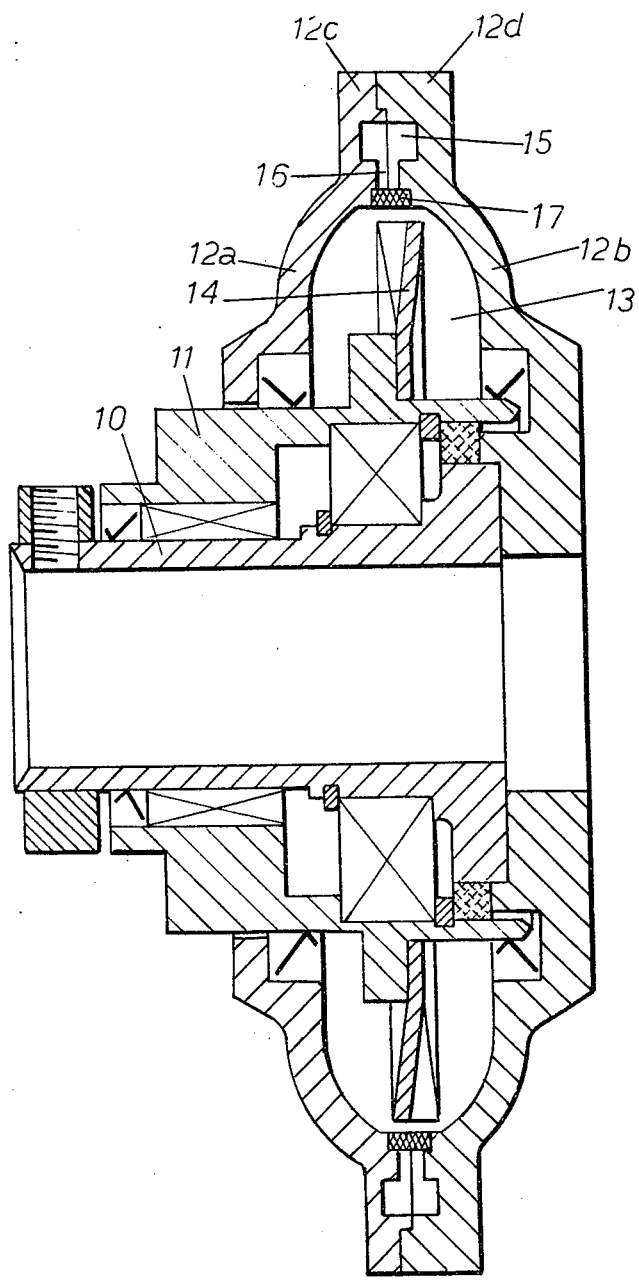
FIG. 1 is a cross-section of a first mechanism in accordance with the invention.

As shown in the drawings, a mechanism operable as a clutch or vibration damper includes an inner rotor or shaft 10, a coaxial rotor 11 journalled on the inner rotor, and an annular housing 12, formed in two parts 12a, 12b which are coaxial with the rotors 10 and 11, secured to the inner rotor for rotation therewith, and surrounding the outer rotor to define therewith an annular space 13. The parts 12a, 12b of the housing are each provided with a circular peripheral flange 12c, 12d coaxial with the rotors, these two flanges abutting one another and being secured together. Dynamic seals are provided between the outer rotor 11 and the two parts 12a and 12b of the housing.

Figure 2:
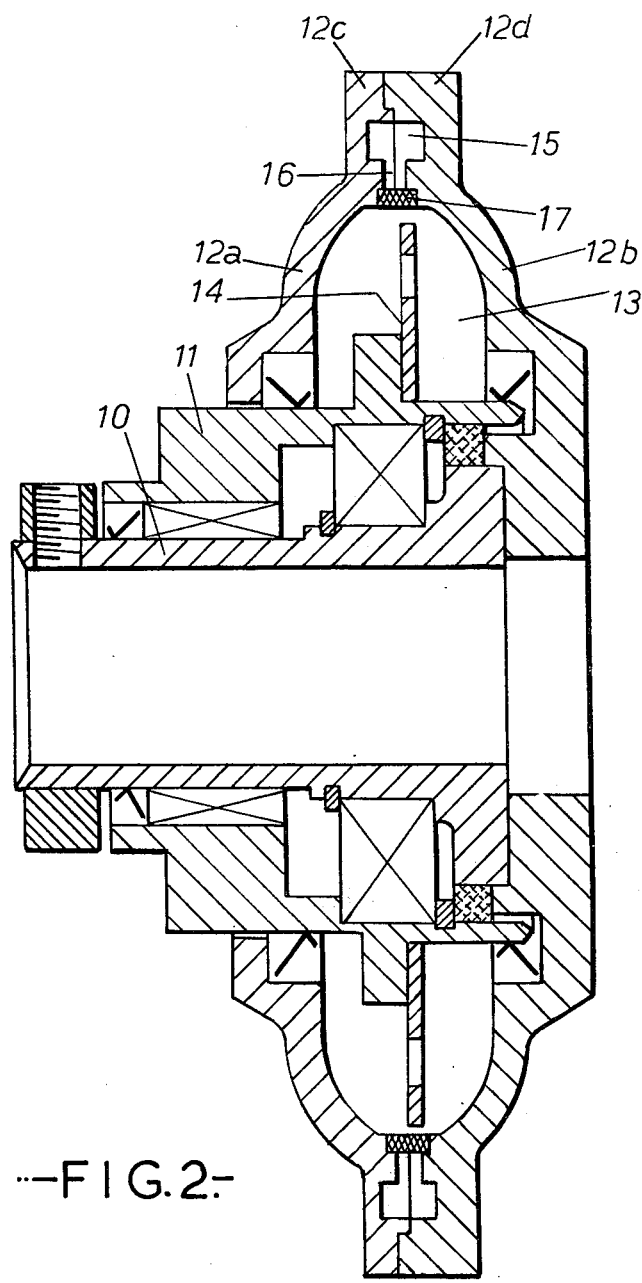
FIG. 2 is a cross-section of a second mechanism in accordance with the invention.

The outer rotor 11 is also provided with a radial flange to which is secured a radial annular disc 14 formed around its circumference with radial corrugations (FIG. 1) and/or containing one or more circular arrays of equiangularly spaced axially extending holes (FIG. 2); alternatively the disc may be planar as shown in FIG. 2.

In order to provide a coupling between the annular disc and the housing to damp vibrations or to provide means for transmitting drive, the annular space 13 contains a charge of shot, for example cast iron shot, having diameters typically in the range 0.022 to 0.032 inches. In operation, this shot is impelled by centrifugal force against the radially outer part of the chamber where it is engaged by the periphery of the disc and provides the necessary coupling between the disc and the housing.

Furthermore, in order to prevent any dust produced after a period of use from contaminating the charge of shot, the flanges of the housing are recessed to define therebetween an annular chamber 15 radially outwardly of the annular space 13 within the housing, and there is a restricted passage 16 in the wall of the housing between the annular space 13 and the annular chamber 15. The passage is shown as a continuous ring, but it may be intermittent.

The features described so far are in general described in our above-mentioned Patent Specification. Since however the passage of material between the inner and outer chambers in the above mentioned Patent Specification was restricted only by the width of passage 16, this width had to be substantially less than the diameter of the shot to avoid loss of shot into the annular chamber 15. This however severely restricted the effectiveness of the passage in clearing the charge of unwanted dust.

According to the present improvement or modification, the entrance to the passage 16 is provided with a wire mesh screen 17, dimensioned to permit dust to pass from the inner chamber 13 into the passage 16 but prevent shot from doing so. Accordingly the width of the passage 16 can be substantially greater than that allowed in the mechanism of the previous patent specification and if necessary can be substantially wider than the diameter of the shot. For example, in a clutch or vibration damper in which the diameter of the inner rotor 10 is 6 inches, the width of passage 16 (measured parallel to the axis of rotation) can conveniently be 0.125 inches, or more.

The wire mesh screen 17 preferably includes several layers of knitted wire; the mesh of a given layer may have apertures of 0.020 inches. The important criterion is that the apertures should be sufficiently small to prevent the cast iron shot passing through it, the shot typically having a minimum diameter of 0.022 inches.

What is claimed is:

1. A mechanism operable as a clutch or vibration damper comprising a first member, a second member mounted coaxially on said first member for rotation with respect thereto, a chamber defined by said first and second members, a radial extension on said first member extending into said chamber, particulate coupling medium in said chamber for forming a vibration damping or drive coupling between said first and second members, and a passage extending radially outwardly of said chamber wherein a screen is provided across said passage, said screen defining openings which are dimensioned to allow the passage of dust but not of said coupling medium.

2. The mechanism of claim 1, wherein said screen is formed from a meshed material.

3. The mechanism of claim 2, wherein said screen comprises several layers of knitted wire.

4. The mechanism of claim 1, wherein said second member defines a second chamber radially outwardly of said first chamber and connected to said first chamber by said passage.

5. The mechanism of claim 1, wherein said second chamber is annular and embraces said first chamber.

6. The mechanism of claim 5, wherein said passage is annular and extends around said first chamber.

7. The mechanism of claim 1, wherein said radial extension to said first member is annular.

8. The mechanism of claim 7, wherein said annular extension is corrugated.

9. The mechanism of claim 7, wherein said annular extension is planar.

10. The mechanism of claim 7, wherein said extension has a plurality of apertures disposed therearound.

11. A mechanism operable as a clutch or vibration damper comprising a rotor, a housing journalled in a bearing on said rotor for coaxial rotation relative thereto and a chamber in said housing, said rotor comprising a hub, a disc extending radially outwardly of said hub into said chamber, said chamber containing a charge of particulate coupling medium which, during rotation of said housing forms a vibration damping or drive coupling between said disc and said housing, the mechanism including a passage in the radially outer wall of said housing and a meshed screen across said passage whereby, in use, dust can escape from said chamber through said passage while said coupling medium is retained in said chamber.

* * * * *